UNITED STATES PATENT OFFICE.

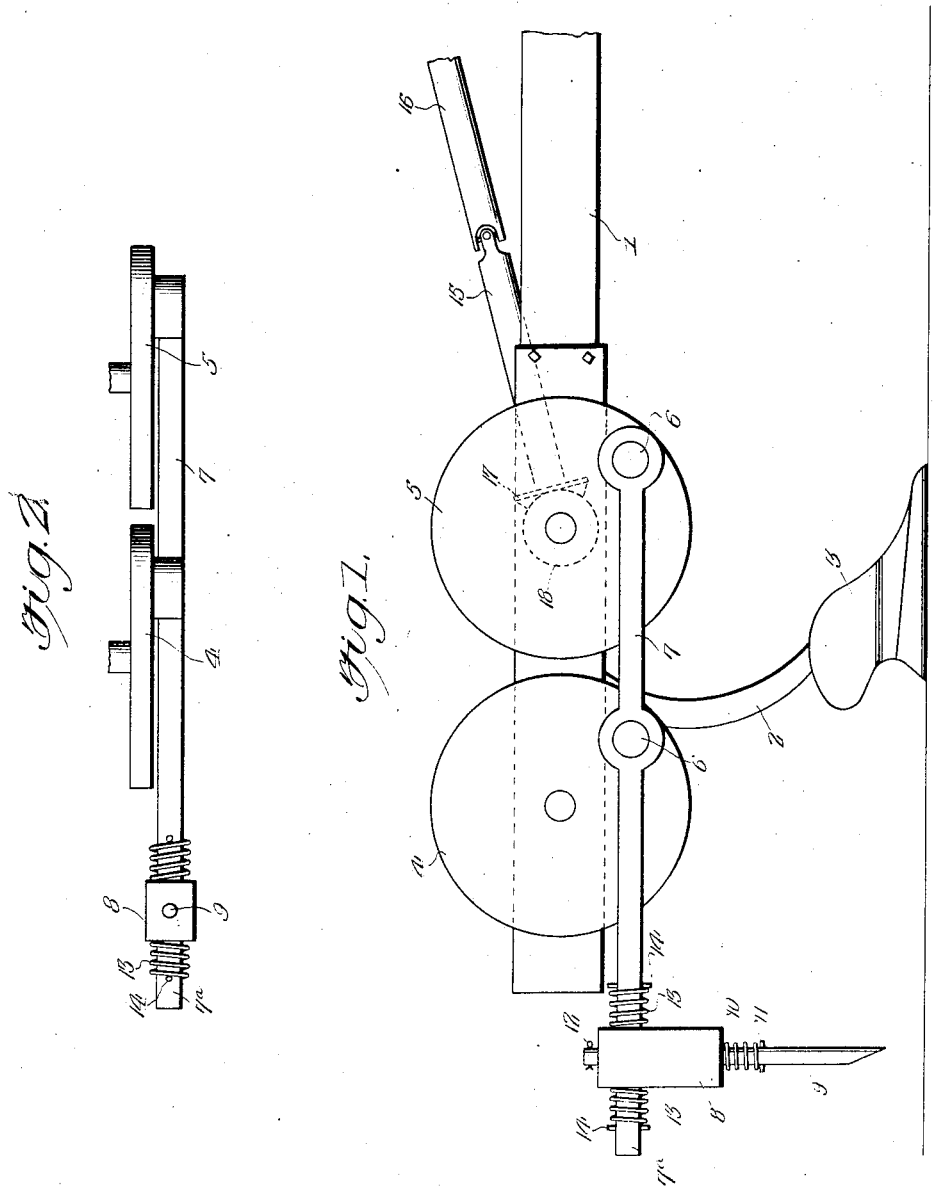

JOHN VERSTEEG, OF ST. JOHNS, OREGON.

AGRICULTURAL IMPLEMENT.

1,348,255.   Specification of Letters Patent.   Patented Aug. 3, 1920.

Application filed April 30, 1920. Serial No. 377,906.

*To all whom it may concern:*

Be it known that I, JOHN VERSTEEG, a citizen of the United States, and a resident of St. Johns, in the county of Portland and State of Oregon, have invented certain new and useful Improvements in Agricultural Implements, of which the following is a specification.

My invention is an improvement in agricultural implements, and has for its object to provide in an implement of the character specified, a means for thoroughly cutting and breaking up the soil as it is turned by the plow, the said means working upon the strip of earth turned by the plow and being operated by the movement of the plow.

In the drawings:—

Figure 1 is a side view of the improved implement,

Fig. 2 is a top plan view of the device and its connection.

In the present embodiment of the invention, the beam 1 which carries the standard 2 having the plow 3 journaled thereon, a pair of wheels or disks 4 and 5, the said wheels being of the same diameter as shown, and each wheel has an eccentric crank pin 6. A link 7 connects these pins, and this link which has a bearing for each pin, is extended rearwardly of the pin 6 on the crank 4 as indicated at 7ª. Upon this extension 7ª there is mounted to slide a block 8, and this block carries a cutting blade 9 which is vertically movable in an opening in the block as shown.

A coil spring 10 encircles the blade between the block and a cross pin 11 on the blade, and this spring acts normally to move the blade downward as shown. The blade is limited in its downward movement by a cotter pin 12 which is passed transversely of the same above the block.

Cushioning springs 13 encircle the extension 7ª of the link 7 on opposite sides of the block, being arranged between the block and stop pins 14 which are passed transversely of the link, and these springs act to cushion the shock of the blade against the strip of soil turned, as the blade is moved toward and from the said strip.

The disk 5 is rotated in any suitable manner, as for instance by a shaft 15, which is connected by a universal joint connection with another shaft 16 operated by the tractor which drags the plow. This shaft 16 has at its rear end a bevel gear 17 which meshes with a gear 18 on the shaft of the disk 5.

In operation, when the plow is drawn through the field, and a furrow is turned thereby, the blade 9 has imparted thereto a hoeing motion, because of its mounting. The link 7—7ª is moved in parallel lines vertically, and it will raise and lower the blade 9, at the same time moving the said blade forwardly and rearwardly and closely simulating the movement imparted to a hoe when using the same.

It will be understood that the device is adapted for use for gang plows, and a blade 9 will be arranged in rear of each plow. These blades may be of any desired width, and the lower ends are beveled as shown. The blades are cushioned against the shock and jar of the striking movement, and of the forward and rearward movement with respect to the links 7.

I claim:—

1. In combination with the plow and the means for supporting the same, of a blade for cutting the soil turned by the plow, a link upon which said blade is mounted to move longitudinally and vertically, means for cushioning the blade against the link, said means for moving the link comprising disks journaled on the plow support, the disks having eccentric journal pins on which the link is pivoted.

2. In combination with the plow and the means for supporting the same, of a blade for cutting the soil turned by the plow, a link upon which said blade is mounted to move longitudinally and vertically, said means for moving the link comprising disks journaled on the plow support, the disks having eccentric journal pins on which the link is pivoted.

3. In combination with a plow, and the means for supporting the same of a link, means controlled by the forward movement of the plow for moving the said link forwardly and rearwardly and vertically, and a blade mounted to move longitudinally of the link and normally yieldingly held on the link from such movement longitudinally of the link.

JOHN VERSTEEG.